US012629238B1

(12) United States Patent
Fan

(10) Patent No.: US 12,629,238 B1
(45) Date of Patent: May 19, 2026

(54) BRUSH HEAD OF ELECTRIC TOOTHBRUSH AND ELECTRIC TOOTHBRUSH

(71) Applicant: Zhuhai Weisen Trading Co., Ltd., Zhuhai (CN)

(72) Inventor: Jiantong Fan, Zhuhai (CN)

( * ) Notice: Subject to any disclaimer, the term of this patent is extended or adjusted under 35 U.S.C. 154(b) by 0 days.

(21) Appl. No.: 19/372,337

(22) Filed: Oct. 29, 2025

(51) Int. Cl.
  *A61C 17/34* (2006.01)
  *A46B 9/04* (2006.01)
  *A61C 17/22* (2006.01)
(52) U.S. Cl.
  CPC .............. *A61C 17/222* (2013.01); *A46B 9/04* (2013.01); *A61C 17/3436* (2013.01)
(58) Field of Classification Search
  CPC ................................. A61C 17/222; A46B 9/04
  See application file for complete search history.

(56) References Cited

U.S. PATENT DOCUMENTS

2025/0082093 A1* 3/2025 Yau ...................... A46B 13/008

FOREIGN PATENT DOCUMENTS

| CN | 113303936 A | | 8/2021 |
|----|-------------|---|--------|
| CN | 215273513 U | | 12/2021 |
| CN | 118576351 A | | 9/2024 |
| CN | 119655921 A | * | 3/2025 |

* cited by examiner

*Primary Examiner* — Shay Karls
(74) *Attorney, Agent, or Firm* — Nitin Kaushik

(57) ABSTRACT

The present application discloses a brush head of an electric toothbrush and an electric toothbrush. The brush head of an electric toothbrush includes a brush head assembly, a housing assembly and a quiet transmission assembly, wherein the brush head assembly includes bristles and a brush base; the housing assembly is a hollow structure having an accommodation space disposed therein, the accommodation space, at its top, is in communication with a mounting socket, and the brush head assembly is rotatably mounted within the mounting socket; and the quiet transmission assembly is disposed within the accommodation space, and comprises an oscillating shaft, a quiet sleeve and a transmission hub, the upper end of the oscillating shaft is connected to the brush base to drive the brush base to perform oscillating rotation.

10 Claims, 10 Drawing Sheets

100

200

323

321

322

220

210

BRUSH HEAD OF ELECTRIC TOOTHBRUSH AND ELECTRIC TOOTHBRUSH

TECHNICAL FIELD

The present application relates to the technical field of electric toothbrushes, and in particular to a brush head of an electric toothbrush and an electric toothbrush.

BACKGROUND

With the evolving trends in lifestyle, growing public attention is paid on dental health and electric toothbrushes with enhanced cleaning capabilities emerge accordingly. An electric toothbrush includes a brush head, and a toothbrush handle that has a drive motor disposed therein. Through the actuation of the drive motor, the brush head of the electric toothbrush is enabled to oscillate or rotate, thereby achieving efficient teeth cleaning. Here, the brush head of the electric toothbrush needs to both meet the requirements for high-speed motion to clean teeth and to minimize the noise caused by such motion, so as to provide users with an improved teeth brushing experience.

SUMMARY

In view of the above issues, the present application discloses a brush head of an electric toothbrush and an electric toothbrush to address or at least partially address the above issues.

In order to achieve the above objectives, the present application adopts the following technical solutions.

In one aspect of the present application, a brush head of an electric toothbrush is provided. The brush head includes a brush head assembly, a housing assembly and a quiet transmission assembly, wherein the brush head assembly includes bristles and a brush base;

the housing assembly is a hollow structure having an accommodation space disposed therein, the accommodation space, at its top, is in communication with a mounting socket, and the brush head assembly is rotatably mounted within the mounting socket; and the quiet transmission assembly is disposed within the accommodation space, and comprises an oscillating shaft, a quiet sleeve and a transmission hub, the upper end of the oscillating shaft is connected to the brush base to drive the brush base to perform oscillating rotation, the quiet sleeve is sleeved over the oscillating shaft and in tight fit with the housing assembly to constrain the oscillation amplitude of the oscillating shaft, the transmission hub is configured to connect to a toothbrush handle, is disposed below the quiet sleeve, and is in interference fit with the housing assembly, and the lower end of the oscillating shaft passes through the transmission hub to connect to a drive motor assembly.

In some embodiments, the oscillating shaft has a bent portion at its upper end, with the quiet sleeve sleeved below the bent portion; and the quiet transmission assembly further comprises an elastic member that is disposed below the quiet sleeve, and the elastic member enables the quiet sleeve to be fixed in position in the up-down direction relative to the oscillating shaft by upwardly biasing the quiet sleeve.

In some embodiments, the elastic member is a coil spring sleeved over the oscillating shaft; and an oscillation gap is disposed between the oscillating shaft and the transmission hub, and the coil spring is accommodated within the oscillation gap.

In some embodiments, the oscillating shaft is provided with a first shaft shoulder and a second shaft shoulder; the first shaft shoulder is located above the second shaft shoulder and abuts against the coil spring; and the second shaft shoulder is configured to connect to the drive motor assembly.

In some embodiments, the transmission hub is a diameter-varying structure and has a shoulder disposed at a middle portion thereof, and a region of the transmission hub above the upper face of the shoulder is in an interference fit with the housing assembly; and a shaft key lug is disposed on the upper face of the shoulder, and is keyed with the housing assembly for positioning.

In some embodiments, the back of the brush base is provided with a shaft hole, and a connection pivot is disposed within the shaft hole for rotatably connecting the brush base to the housing assembly; and a radial pin hole is further disposed on the back side of the brush base, and a positioning pin is disposed in the pin hole to engage the brush base with the housing assembly.

In some embodiments, the brush base is provided with a pin slot corresponding to the positioning pin, and is provided with a shaft slot corresponding to the oscillating shaft.

In some embodiments, the lower end of the transmission hub is provided with a snap-fit mechanism that is configured for snap-fit connection with the toothbrush handle of the electric toothbrush, and the interference retention force between the transmission hub and the housing assembly is greater than the snap-fit retention force between the snap-fit mechanism and the toothbrush handle of the electric toothbrush.

In some embodiments, each of the upper and lower ends of the quiet sleeve is provided with a radially extending circular retaining flange, and the outer peripheral surface of each circular retaining flange is uniformly provided with a plurality of sets of ribs; and each of the upper and lower end faces of the quiet sleeve is provided with an end face protrusion.

In another aspect of the present application, an electric toothbrush is provided. The electric toothbrush includes a toothbrush handle and any of the above brush heads.

The advantages and beneficial effects of the present application are as follows.

The present application provides a brush head of an electric toothbrush, the brush head including a brush head assembly, a housing assembly and a quiet transmission assembly. Here, the quiet transmission assembly is disposed within the accommodation space of the housing assembly, and includes an oscillating shaft, a quiet sleeve and a transmission hub. The upper end of the oscillating shaft is connected to a brush base to drive the brush base to perform oscillating rotation. The quiet sleeve is sleeved over the oscillating shaft and is in tight fit with the housing assembly, such that it can constrain the oscillation amplitude of the oscillating shaft, limit the oscillation distance of the oscillating shaft, and thus prevent the noise generated by the oscillating shaft and the brush head assembly due to excessive looseness. Simultaneously, the quiet sleeve is further capable of increasing the oscillation frequency of the oscillating shaft, reducing operational noise of the electric toothbrush and enhancing cleaning effectiveness.

BRIEF DESCRIPTION OF DRAWINGS

Various additional advantages and benefits will become apparent to those of ordinary skill in the art by reading the following detailed description of the preferred embodiments. The accompanying drawings are only intended for the purpose of illustrating the preferred embodiments and are not to be construed as limiting the present application. Moreover, throughout the drawings, the same reference numerals are used to designate the same components. Among the accompanying drawings.

Figure 1:
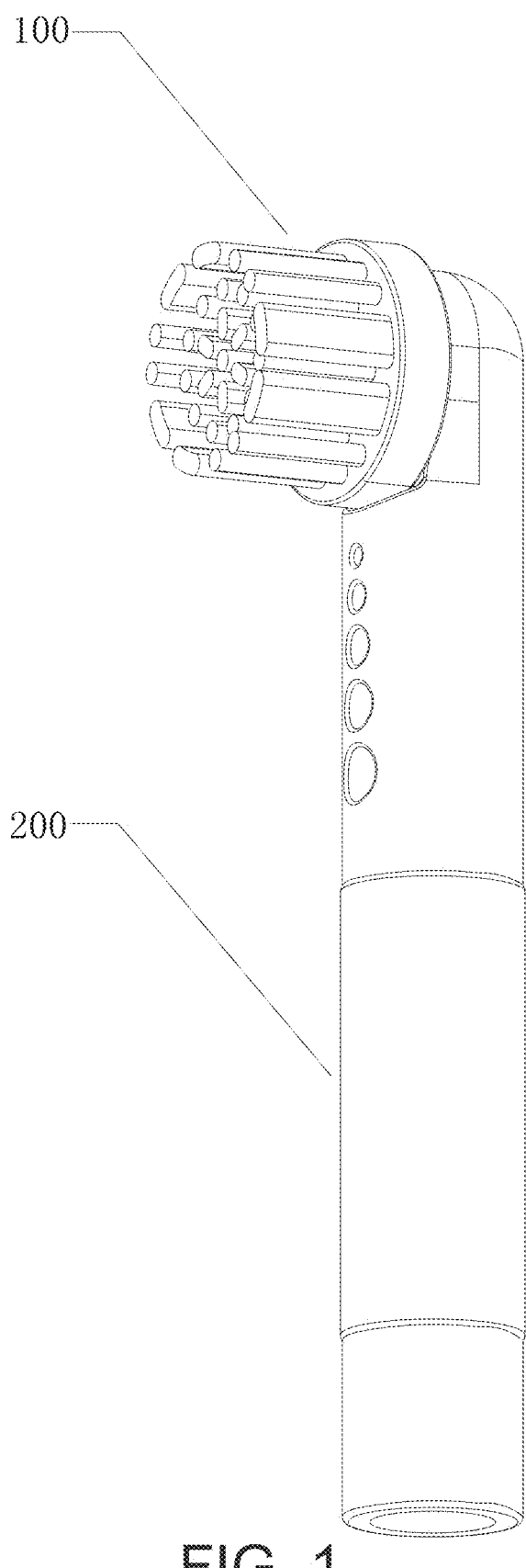
FIG. 1 is an isometric view illustrating a whole assembled brush head of an electric toothbrush in an embodiment of the present application.
Figure 2:
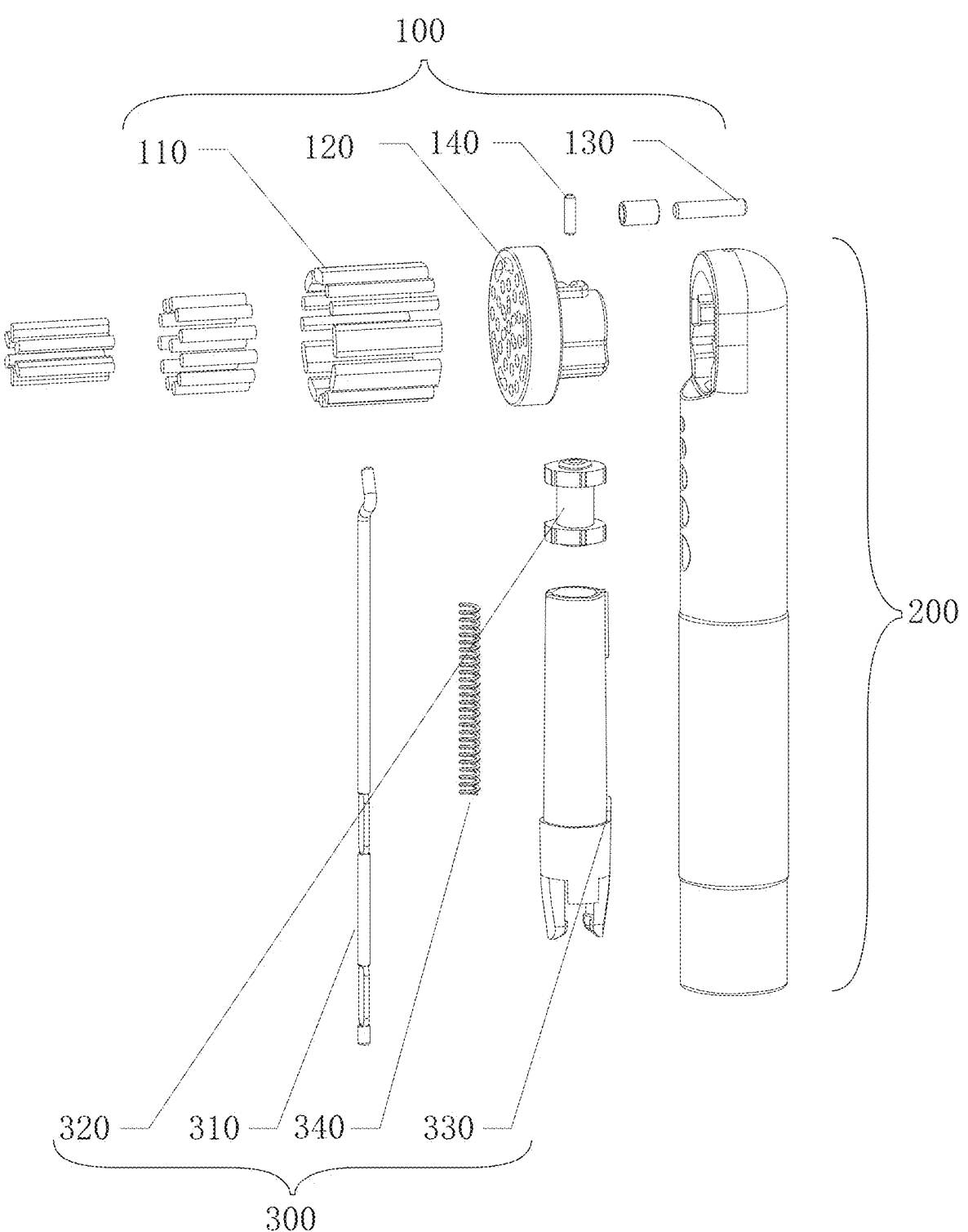
FIG. 2 is an exploded isometric view illustrating the structure of the brush head of an electric toothbrush in the embodiment of the present application.

In the drawings,
100: Brush head assembly; 110: Bristles; 120: Brush base; 121: Pin slot; 122: Shaft slot; 130: Connection pivot; 140: Positioning pin;
200: Housing assembly; 210: Connection hole; 220: Mounting socket;
300: Quiet transmission assembly; 310: Oscillation shaft; 311: First shaft shoulder; 312: Second shaft shoulder; 320: Quiet sleeve; 321: Circular retaining flange; 322: Rib; 323: Protrusion; 330: Transmission hub; 331: Shoulder; 332: Shaft key lug; 333: Snap-fit mechanism; 340: Elastic member;
400: Toothbrush handle; 410: Docking snap-fit slot.

DETAILED DESCRIPTION OF THE EMBODIMENTS

To make the objectives, technical solutions and advantages of the present application clearer, the technical solutions of the present application will be clearly and completely described below in conjunction with specific embodiments of the present application and the corresponding drawings. Obviously, the described embodiments are only some, not all, of the embodiments of the present application. Based on the embodiments in the present application, all other embodiments obtained by those of ordinary skill in the art without paying creative efforts shall fall within the scope of protection of the present application.

The technical solutions provided by the various embodiments of the present application will be described in detail below in conjunction with the accompanying drawings.

It should be noted that, the embodiments in the present application and the features therein can be combined with each other as long as there is no conflict. The present application will be described in detail below with reference to the accompanying drawings and in conjunction with the embodiments.

It should be noted that the following detailed descriptions are illustrative and are intended to provide further explanation of the present application. Unless otherwise specified, all technical and scientific terms used herein have the same meaning as commonly understood by one of ordinary skill in the technical field to which the present application belongs.

For ease of description, spatially relative terms such as "on", "above", "on the upper surface of", and "over" may be used herein to describe the spatial relationship of one device or feature relative to another device or feature as illustrated in the figures. It is should be understood that the spatially relative terms are intended to encompass different orientations of the device in use or operation in addition to the orientation depicted in the figures. For example, if the figures are viewed in an inverted manner, a device described as being "above" or "over" another device or structure would then be oriented as being "below" or "beneath" said another device or structure. Thus, the exemplary term "above" can encompass both of the orientations indicated by "above" and "below". The device may be otherwise oriented (rotated 90 degrees or at other orientations), and the spatially relative descriptors used herein may be interpreted accordingly.

It is to be noted that the terminology used herein is only for the purpose of describing specific implementations and is not intended to limit the exemplary implementations according to the present application. As used herein, unless the context clearly indicates otherwise, the singular forms are intended to include the plural forms as well. Furthermore, it should be understood that the terms "include" and/or "comprise", when used in this specification, specify the presence of features, steps, operations, devices, components and/or combinations thereof.

It is to be noted that the terms "first", "second", and the like used in the specification and claims of the present application and in the above-mentioned drawings are intended to distinguish similar objects, and are not necessarily used to describe a specific order or sequence. It is to be understood that the terms so used may be interchanged under appropriate circumstances such that the implementations of the present application described herein can be implemented, for example, in an order other than those illustrated or described herein. Furthermore, the terms "comprises" and "have" and any variations thereof are intended to cover a non-exclusive inclusion. For example, a process, method, system, product or apparatus that includes a series of steps or elements is not necessarily limited to those steps or elements expressly listed, but may include other steps or elements that are not expressly listed or are inherent to such process, method, product or apparatus.

FIGS. 1 to 10 schematically illustrate a brush head of an electric toothbrush in an embodiment of the present application.

Referring to FIGS. 1 to 10, the present application discloses a brush head of an electric toothbrush. The brush head of an electric toothbrush is a rotary cleaning brush head that includes a brush head assembly 100, a housing assembly 200 and a quiet transmission assembly 300.

The brush head assembly 100 includes bristles 110 and a brush base 120. The bristles 110 are fixed to the front side of the brush base 120 for frictionally cleaning teeth. The bristles 110 may be disposed in a plurality of groups arranged in annular rings with different diameters. Furthermore, the respective bristles may employ different thicknesses and heights to achieve comprehensive cleaning of the teeth.

The housing assembly 200 is a hollow structure for mounting the brush head and accommodating the transmission assembly. The housing assembly 200 has an accommodation space disposed therein. The accommodation space, at its top, is in communication with a mounting socket 220, and at its bottom, is in communication with a connection hole 210. The connection hole 210 is configured for insertion and connection of a toothbrush handle. The brush head assembly 100 is rotatably mounted within the mounting socket 220. The quiet transmission assembly 300 is mounted within the accommodation space. The quiet transmission assembly 300 extends through the accommodation space to connect to the brush head assembly 100, and drives the brush head assembly 100 to move.

As shown in FIGS. 1 to 10, the quiet transmission assembly 300 is disposed within the accommodation space, and includes an oscillating shaft 310, a quiet sleeve 320 and a transmission hub 330. The upper end of the oscillating shaft 310 is connected to the brush base 120 to drive the brush base 120 to perform oscillating rotation. The quiet sleeve 320 is sleeved over the oscillating shaft 310 and in tight fit with the housing assembly 200. Therefore, the quiet sleeve 320 can constrain the oscillation amplitude of the oscillating shaft 310, thereby limiting the oscillation motion of the oscillating shaft 310 and the brush head assembly 100 driven thereby, so as to prevent generation of significant noise due excessive looseness. The transmission hub 330 is disposed below the quiet sleeve 320 and is configured to connect to the toothbrush handle 400. The transmission hub 330 is in interference fit with the housing assembly 200 and is fixedly mounted within the accommodation space to stably connect to the toothbrush handle 400. The lower end of the oscillating shaft 310 passes through the transmission hub 330 to connect to a drive motor assembly within the toothbrush handle 400.

With the above structure, in the brush head of an electric toothbrush in the embodiment of the present application, the quiet sleeve 320 is disposed over the oscillating shaft 310. The oscillation amplitude of the oscillating shaft 310 is constrained by the quiet sleeve 320 that is sleeved over the oscillating shaft 310 and in tight fit with the housing assembly 200. Therefore, the oscillating distance of the oscillating shaft 310 is limited to restrict the motion of the brush head assembly 100, and to prevent the oscillating shaft 310 and the brush head assembly 100 from generating noise due to excessive looseness. As a result, the noise generated by the toothbrush can be reduced. Simultaneously, the quiet sleeve 320 is further capable of adjusting the oscillation frequency of the oscillating shaft 310. Specifically, by restricting the oscillating motion of a neck portion of the oscillating shaft 310, the quiet sleeve 320 reduces the oscillation length of the oscillating shaft and increases its oscillation frequency. Consequently, in summary, the quiet sleeve 320, by means of increasing the frequency and reducing the amplitude, enhances the effectiveness of teeth cleaning by the transmission of the oscillating shaft 310 while reducing noise.

In some embodiments of the present application, as shown in FIGS. 2 to 6, the oscillating shaft 310 has a bent portion at its upper end. The bent portion is capable of forming a buffer structure. On one hand, it enables the oscillating motion of the oscillating shaft 310 to act on the brush head assembly 100 at an angle, thereby driving the brush head assembly 100 to rotate in an improved manner. On the other hand, the bent portion also provides a stopping structure for the quiet sleeve 320, which can prevent the quiet sleeve 320 from dislodging. This enables the quiet sleeve 320 to reliably perform its function of constraining component movement and thus to reduce noise. In the present embodiment, the quiet sleeve 320 is sleeved below the bent portion and its top portion is in tight fit with both the bent portion and the inner wall of the housing assembly 200. Consequently, the inner wall of the through hole of the quiet sleeve 320 can effectively restrict oscillation of the neck portion of the oscillating shaft 310. By reducing unnecessary oscillating movement in regions of the oscillating shaft 310 and the brush head assembly 100, the transmission efficiency is improved and the noise volume is reduced.

In some embodiments of the present application, as shown in FIGS. 2 to 6, the quiet transmission assembly 300 further includes an elastic member 340 that is disposed below the quiet sleeve 320 and also configured for quiet operation and noise reduction. Specifically, by upwardly biasing the quiet sleeve 320, the elastic member 340 enables the quiet sleeve 320 to be fixed in position in the up-down direction relative to the oscillating shaft 310, thereby ensuring that the quiet sleeve 320 is in reliable tight fit with both the inner wall of the housing assembly 200 and the oscillating shaft 310. Through this biased tight fit, the quiet sleeve 320 can effectively restrict oscillation of the neck portion of the oscillating shaft 310, thereby achieving a noise suppression effect.

Figure 3:
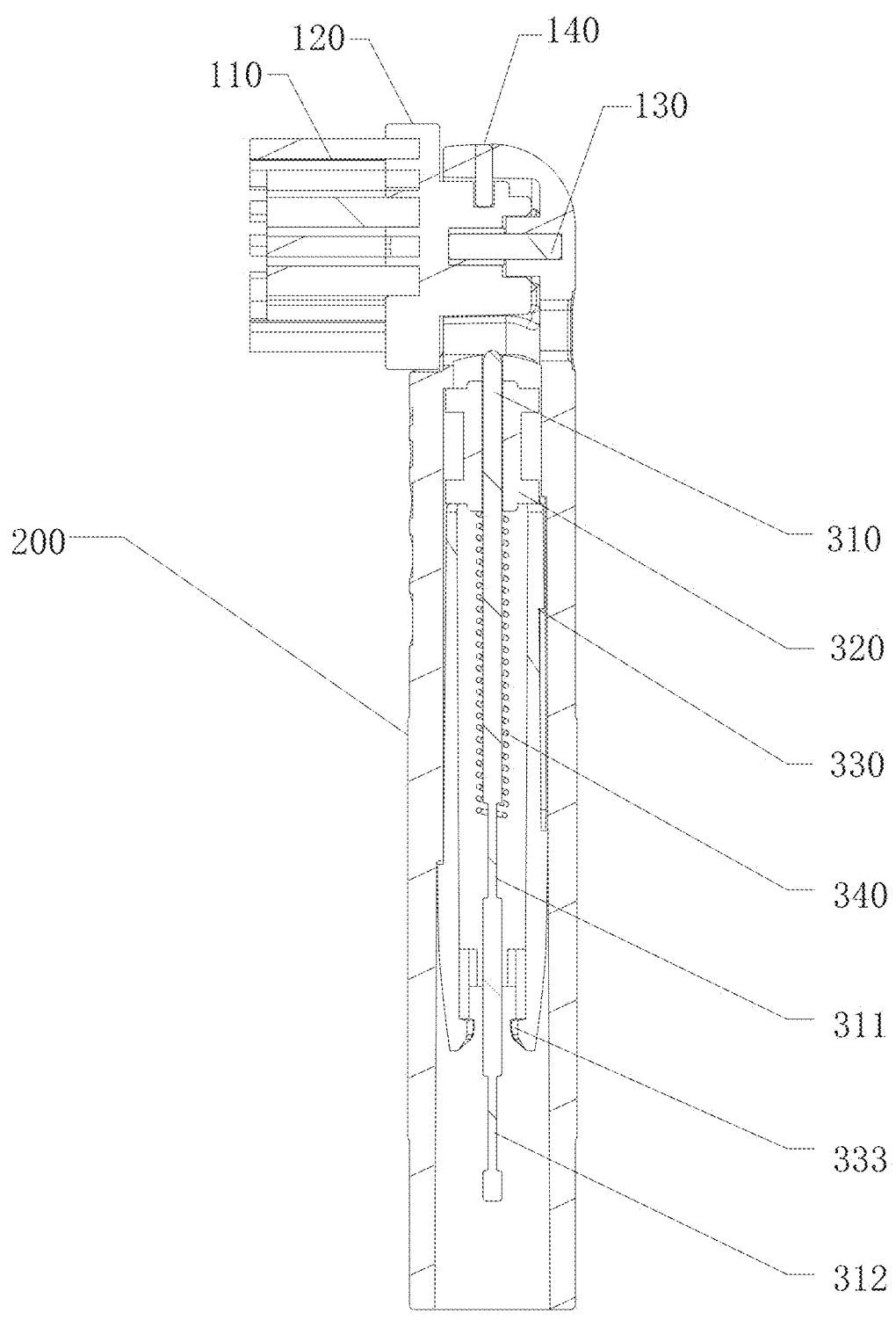
FIG. 3 is a cross-sectional view illustrating the brush head of an electric toothbrush in the embodiment of the present application.

In some embodiments of the present application, the elastic member 340 is a coil spring. The coil spring is sleeved over the oscillating shaft 310 and is also configured to, by increasing the mass of the oscillating structure, further restrict the oscillation amplitude of the oscillating shaft 310, thereby reducing the noise volume caused by the oscillation of the oscillating shaft 310. As shown in FIG. 3, an oscillation gap is disposed between the oscillating shaft 310 and the transmission hub 330. The coil spring is accommodated within the oscillation gap, such that it can extend below the quiet sleeve 320 to continue reducing the ineffective vibration of the waist of the oscillating shaft 310 and to decrease vibration amplitude and noise volume. The provision of the coil spring is also beneficial for improving the grip feel of the toothbrush handle 400, preventing hand numbness caused by vibration during handheld brushing.

Figure 6:
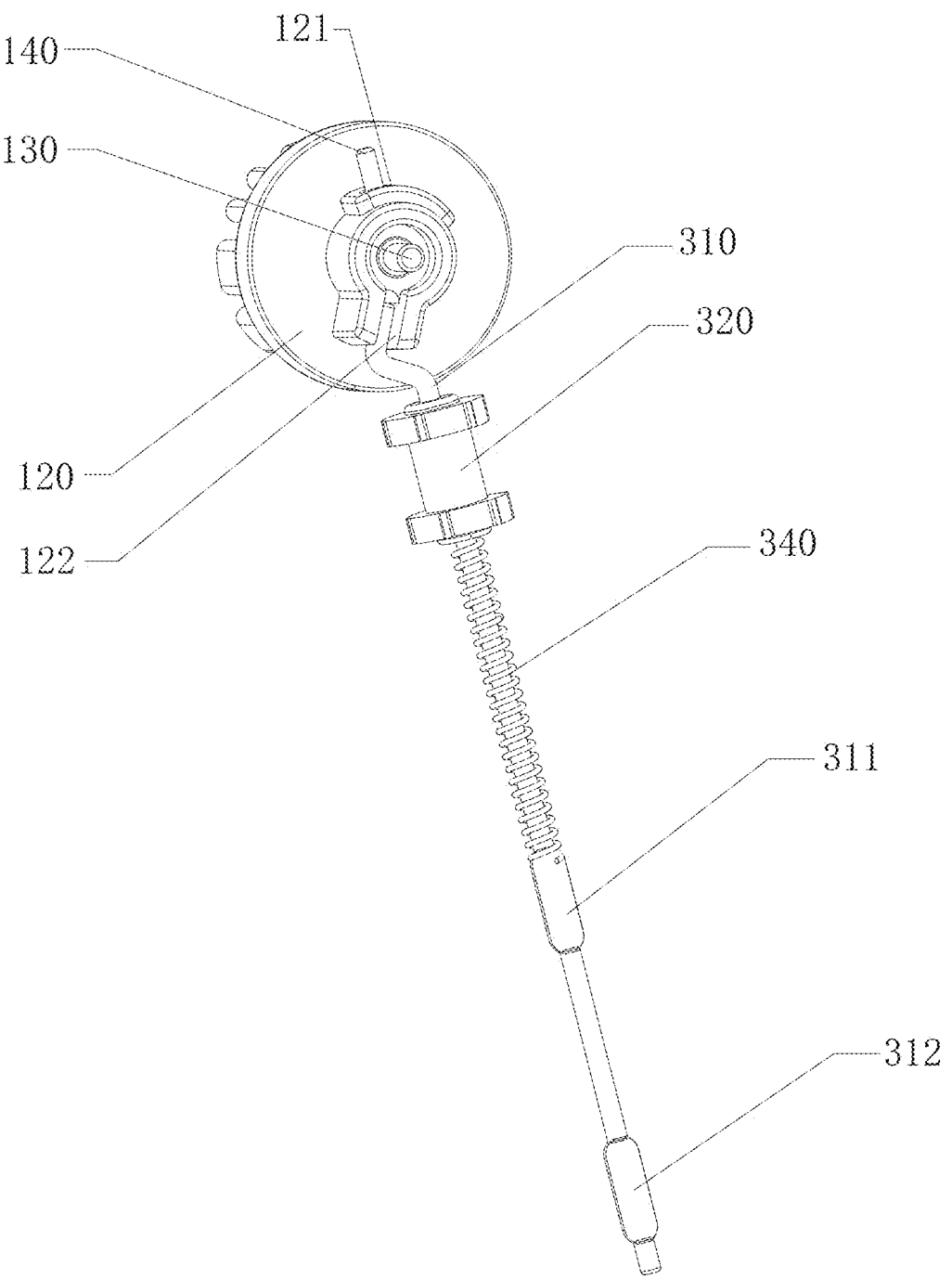
FIG. 6 is a schematic view illustrating the brush head of an electric toothbrush shown in FIG. 5 with a transmission hub removed in the embodiment of the present application.

In some embodiments of the present application, as shown in FIGS. 3 and 6, the oscillating shaft 310 is provided with a first shaft shoulder 311 and a second shaft shoulder 312. The first shaft shoulder 311 is located above the second shaft shoulder 312. The first shaft shoulder 311 abuts against the coil spring for positioning the coil spring and preventing the coil spring from becoming loose. The coil spring is in a preloaded state between the first shaft shoulder 311 and the quiet sleeve 320, reliably biasing the quiet sleeve 320. The second shaft shoulder 312 is located proximate to an end of the oscillating shaft 310 and is configured for connection to the drive motor assembly to receive a driving force.

Figure 4:
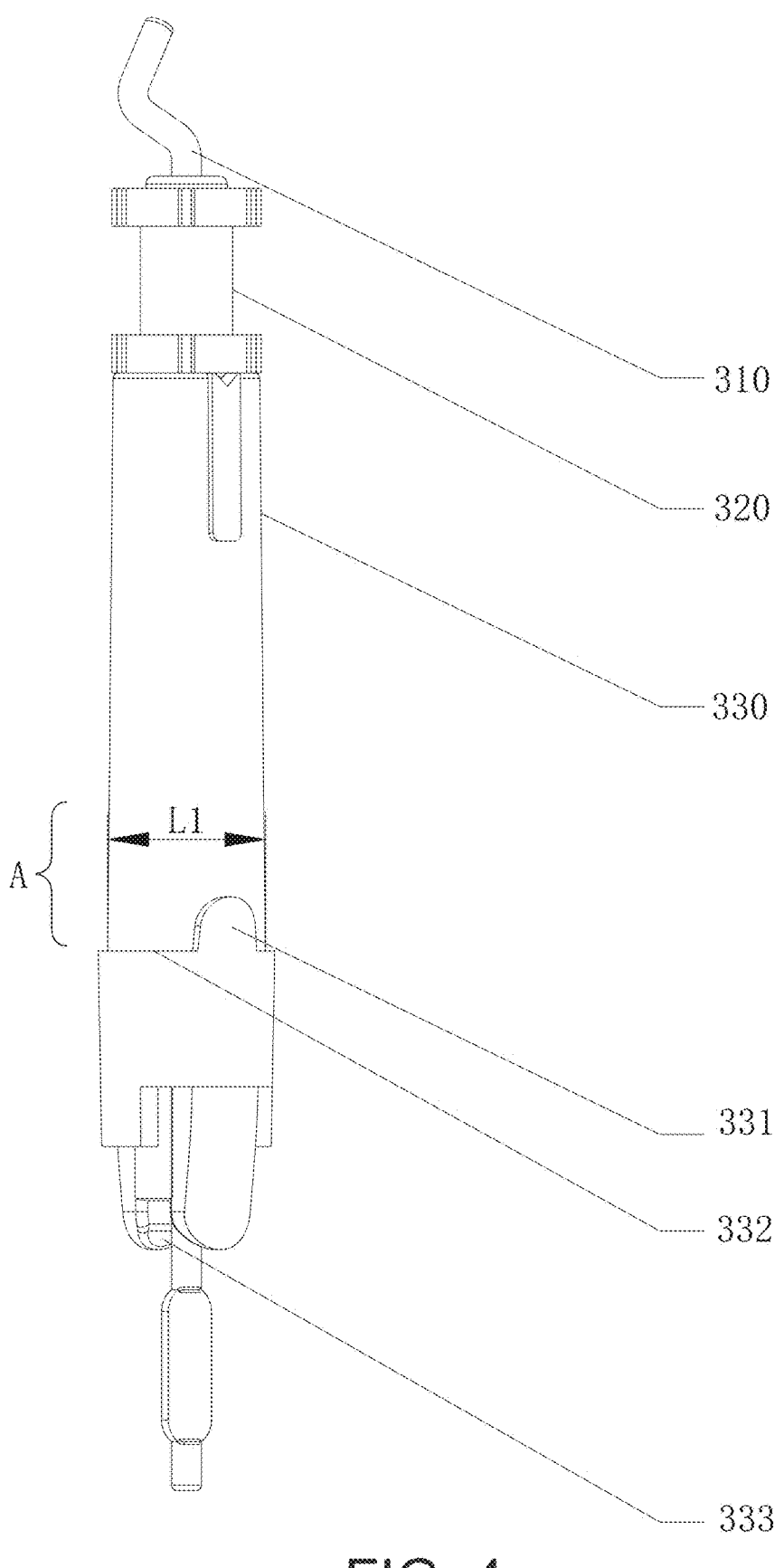
FIG. 4 is an isometric view illustrating a quiet transmission assembly of the brush head of an electric toothbrush in the embodiment of the present application.
Figure 9:
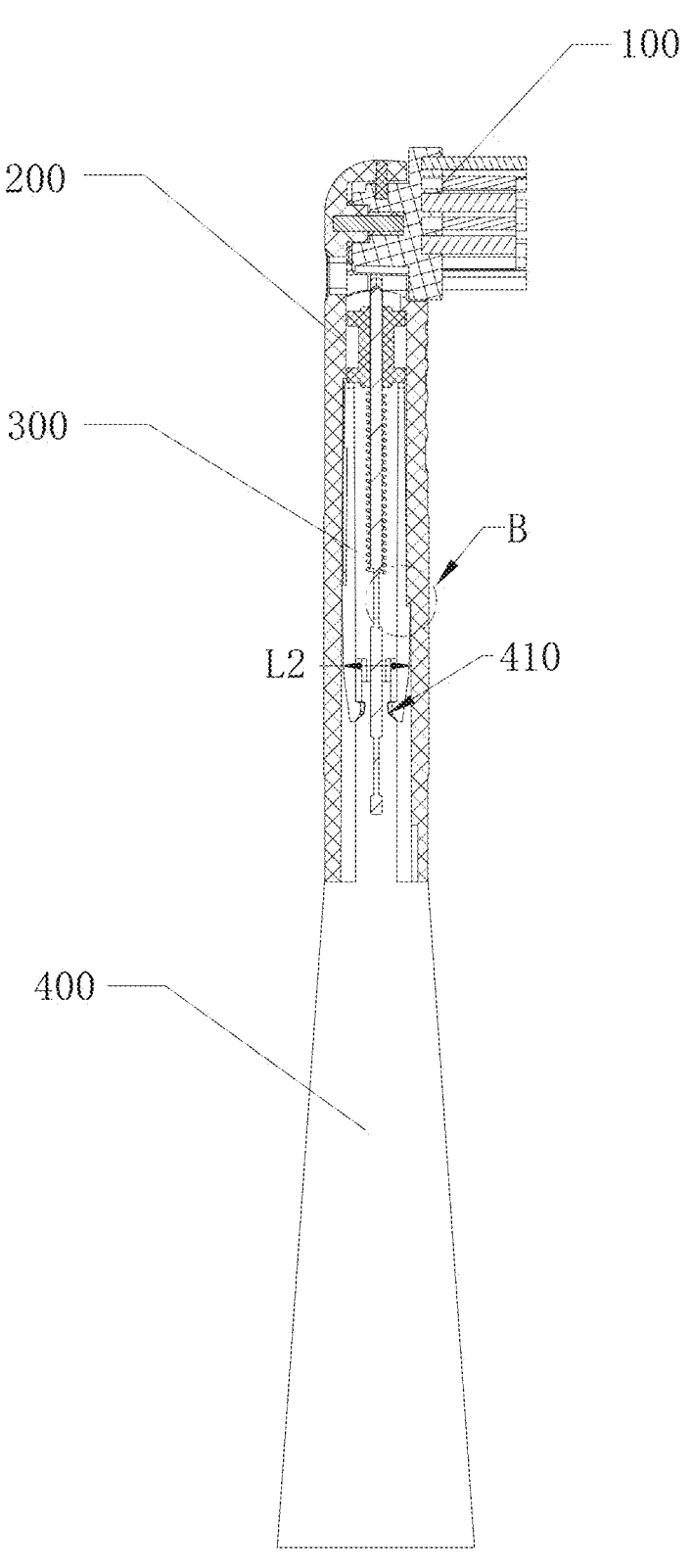
FIG. 9 is a cross-sectional view illustrating an electric toothbrush in an embodiment of the present application.
Figure 10:
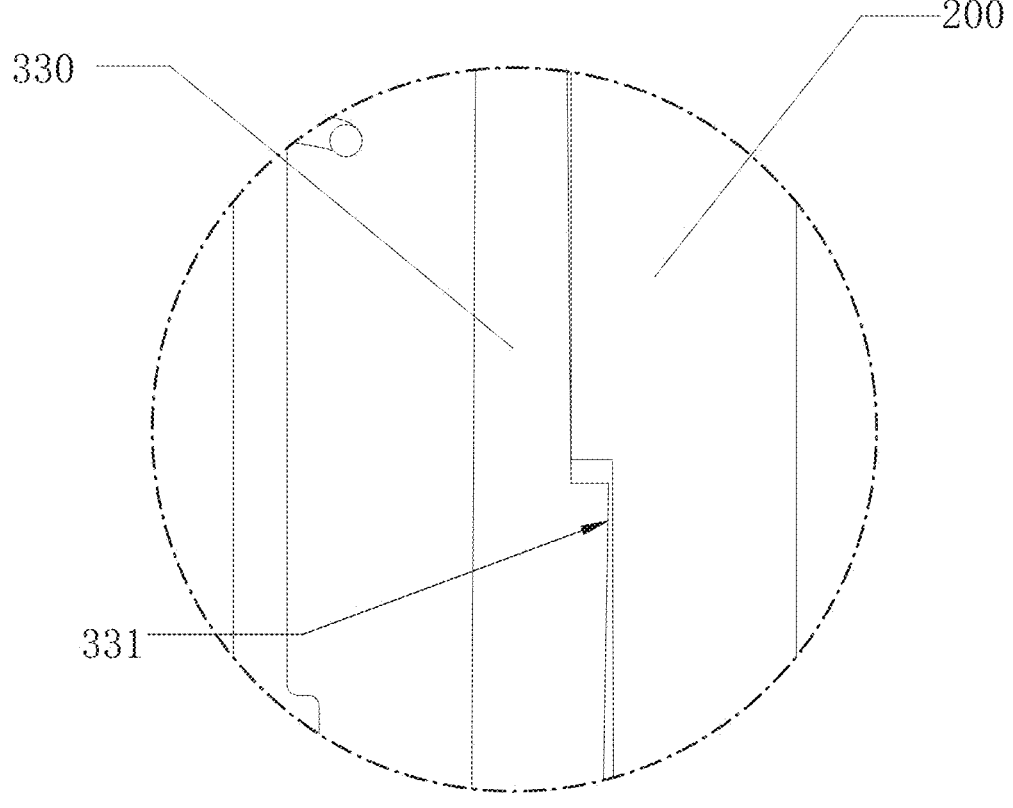
FIG. 10 is an enlarged view of the circled portion shown in FIG. 5 of the brush head of an electric toothbrush in the embodiment of the present application.

In some embodiments of the present application, as shown in FIGS. 4, 9 and 10, the transmission hub 330 is a diameter-varying structure. A shoulder 331 is disposed at a middle portion of the transmission hub 330. A region of the transmission hub 330 above the upper face of the shoulder 331 is in an interference fit with the housing assembly 200. Referring to FIG. 4, the extent of the interference fit region of the transmission hub 330 may be indicated by A shown in the figure. The diameter of section A of the transmission hub 330 is increased to dimension L1. The dimension L1 is at least 0.05-0.08 mm larger than the corresponding inner diameter dimension L2 of the housing assembly 200 shown in FIG. 9, so as to ensure a sufficient retention force for the interference fit therebetween. A shaft key lug 332 is further disposed on the transmission hub 330 to extend upward from the upper face of the shoulder 331. The shaft key lug 332 is located within the interference fit region. The transmission hub 330 is keyed with the housing assembly 200 for positioning via the shaft key lug 332, achieving precise alignment during assembly. By utilizing the protruding feature of the shaft key lug 332, the interference fit between the transmission hub 330 and the housing assembly 200 can also be effectively ensured.

Figure 5:
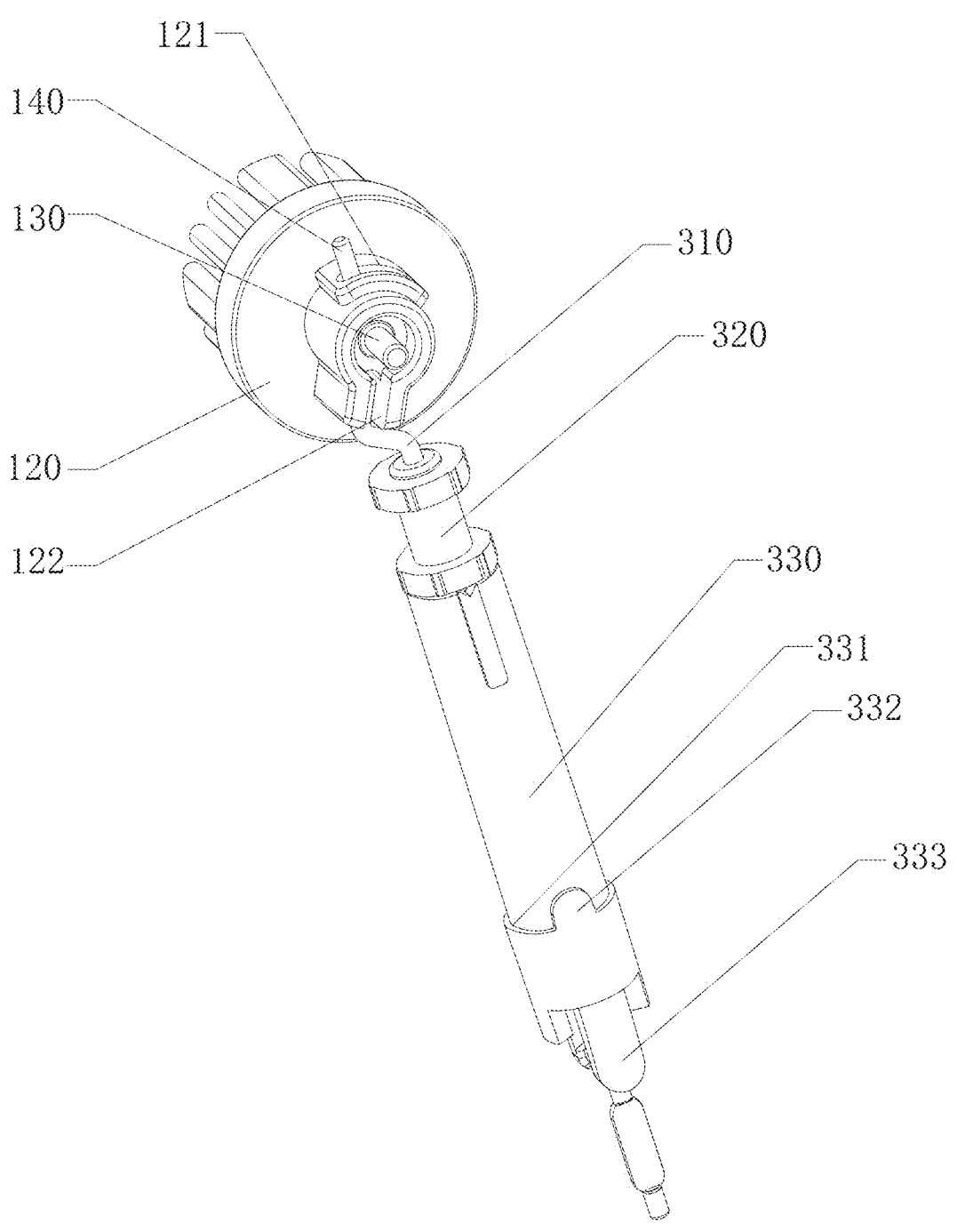
FIG. 5 is a schematic view illustrating the connection structure between the quiet transmission assembly and a brush head assembly of the brush head of an electric toothbrush in the embodiment of the present application.

Furthermore, in some embodiments of the present application, a fool-proofing rib is further disposed on a portion of the transmission positioning block above the shoulder 331. The fool-proofing rib is configured to facilitate the assembly process and to prevent reverse orientation of the transmission hub 330 during assembly. In the present embodiment, as shown in FIGS. 4 and 5, the fool-proofing rib and the shaft key lug 332 are arranged along a straight line. A continuous engagement groove is provided on the inner wall of the housing assembly 200, corresponding to both the fool-proofing rib and the shaft key lug 332.

In some embodiments of the present application, as shown in FIG. 3, the back of the brush base 120 is provided with a shaft hole. A connection pivot 130 is disposed within the shaft hole. The connection pivot 130 rotatably connects the brush base 120 to the housing assembly 200. A radial pin hole is further disposed on the back side of the brush base 120. A positioning pin 140 is disposed within the pin hole. The positioning pin 140 engages the brush base 120 with the housing assembly 200, thereby preventing the brush head assembly 100 from disengaging from the housing assembly 200.

In some embodiments of the present application, as shown in FIGS. 5 and 6, the brush base 120 is provided with a pin slot 121 corresponding to the positioning pin 140. When the brush base 120 rotates following the oscillation of the oscillating shaft 310, the pin slot 121 may undergo reciprocating motion around the positioning pin 140. Furthermore, a shaft slot 122 corresponding to the oscillating shaft 310 is provided on the back side of the brush base 120. The shaft slot 122 is formed in an inclined direction and configured to accommodate the upper end of the bent portion of the oscillating shaft 310, thereby achieving contact drive between the oscillating shaft 310 and the brush base 120.

In some embodiments of the present application, as shown in FIGS. 2 to 5, the lower end of the transmission hub 330 is provided with a snap-fit mechanism 333. The snap-fit mechanism 333 is configured for snap-fit connection with the toothbrush handle 400 of the electric toothbrush. In embodiments of the present application, the interference retention force between the transmission hub 330 and the housing assembly 200 is greater than the snap-fit retention force between the snap-fit mechanism 333 and the toothbrush handle 400 of the electric toothbrush. As an interference fit is employed between the transmission hub 330 and the housing assembly 200, not only is the manufacturing process for processing a snap-fit structure omitted, but also a tight and rattle-free connection between the transmission hub 330 and the housing assembly 200 is achieved, thereby further reducing vibration noise of the electric toothbrush.

Figure 7:
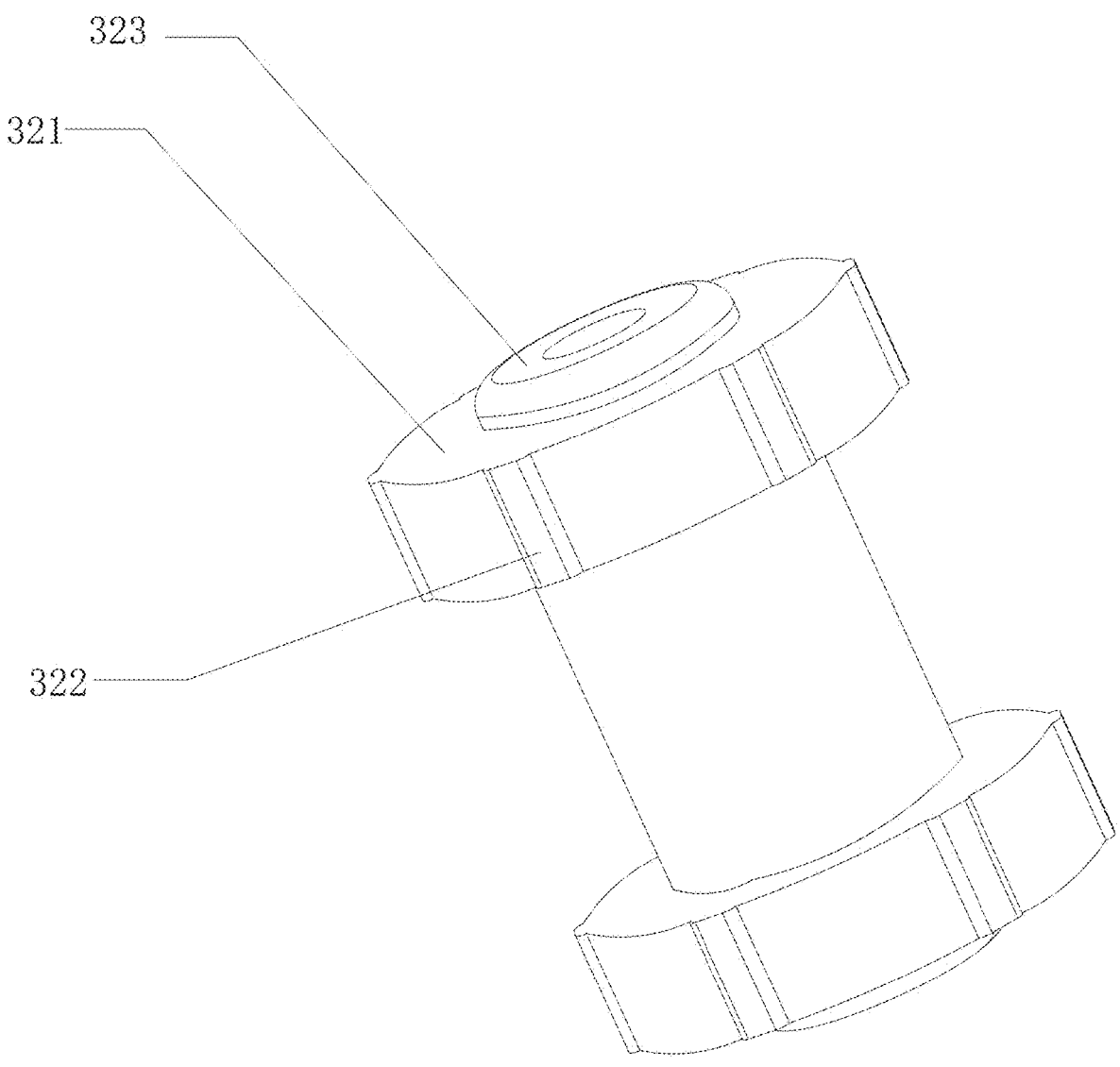
FIG. 7 is an isometric view illustrating a quiet sleeve of the brush head of an electric toothbrush in the embodiment of the present application.
Figure 8:
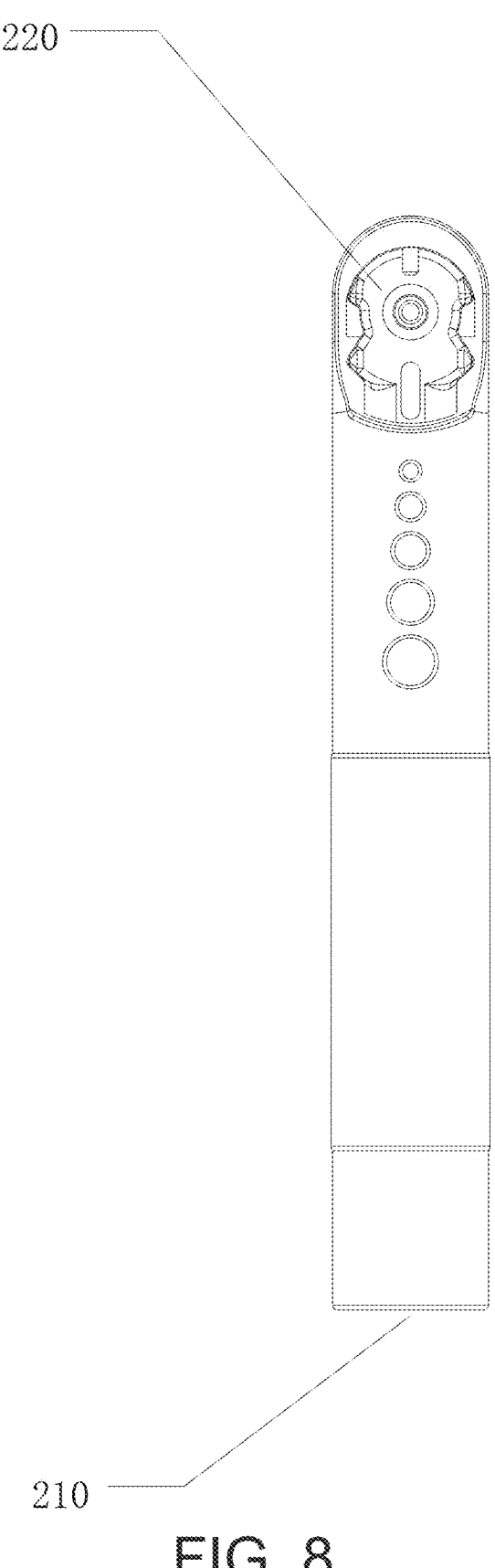
FIG. 8 is an isometric view illustrating a housing assembly of the brush head of an electric toothbrush in the embodiment of the present application.

In some embodiments of the present application, as shown in FIG. 7, each of the upper and lower ends of the quiet sleeve 320 is provided with a radially extending circular retaining flange 321. Both the circular retaining flanges 321 are configured to ensure that a tight fit is formed between the upper and lower ends of the quiet sleeve 320 and the housing assembly 200. In some embodiments of the present application, as shown in FIG. 7, the outer peripheral surface of each circular retaining flange 321 is uniformly provided with a plurality of sets of ribs 322. Furthermore, each of the upper and lower end faces of the quiet sleeve 320 is provided with an end face protrusion 323. Both the ribs 322 and the protrusions 323 are capable of reinforcing the tight-fit connection between the quiet sleeve 320 and components such as the housing assembly 200, thereby ensuring the noise-reducing effect of the quiet sleeve 320.

In another aspect of the present application, an electric toothbrush is also provided. As shown in FIGS. 9 and 10, the electric toothbrush includes: a toothbrush handle 400 and a brush head according to any of the above embodiments. In the electric toothbrush of the present embodiment, via the quiet transmission assembly 300 within the brush head, the vibration transmission effectiveness and the noise reduction performance are improved, thereby reducing the vibration noise and improving the grip feel for the user when he uses the toothbrush.

In some embodiments of the present application, as shown in FIG. 9, a docking snap-fit slot 410 is disposed within the toothbrush handle 400. The docking snap-fit slot 410 engages in a snap-fit manner with the snap-fit mechanism 333 of the transmission hub 330. As shown in FIG. 10, within the circled area B for the enlarged view, an interference fit is formed between the upper edge of the shoulder 331 of the transmission hub 330 and the inner wall of the housing assembly 200. Furthermore, it is to be understood that components such as a battery assembly and the drive motor assembly are also disposed within the toothbrush handle 400. This is well known to those of ordinary skill in the art. The present application can follow the existing technologies, and no redundant description about them will be given here.

In summary, the embodiments of the present application provide a brush head of an electric toothbrush, the brush head including a brush head assembly, a housing assembly and a quiet transmission assembly. Here, the quiet transmission assembly is disposed within the accommodation space of the housing assembly, and includes an oscillating shaft, a quiet sleeve and a transmission hub. The upper end of the oscillating shaft is connected to a brush base to drive the brush base to perform oscillating rotation. The quiet sleeve is sleeved over the oscillating shaft and is in tight fit with the housing assembly, such that it can constrain the oscillation amplitude of the oscillating shaft, limit the oscillation distance of the oscillating shaft, and thus prevent the noise generated by the oscillating shaft and the brush head assembly due to excessive looseness. Simultaneously, the quiet sleeve is further capable of increasing the oscillation frequency of the oscillating shaft, reducing operational noise of the electric toothbrush and enhancing cleaning effectiveness.

The above descriptions are only embodiments of the present application and are not intended to limit the present application. For those of ordinary skill in the art, various modifications and variations can be made to the present application. Any modifications, equivalent substitutions, improvements, etc. made within the spirit and principles of the present application should be encompassed within the scope of the claims of the present application.

What is claimed is:

1. A brush head of an electric toothbrush, the brush head comprising a brush head assembly, a housing assembly and a quiet transmission assembly, wherein the brush head assembly comprises bristles and a brush base;

the housing assembly is a hollow structure having an accommodation space disposed therein, the accommodation space, at its top, is in communication with a mounting socket, and the brush head assembly is rotatably mounted within the mounting socket; and the quiet transmission assembly is disposed within the accommodation space, and comprises an oscillating shaft, a quiet sleeve and a transmission hub, the upper end of the oscillating shaft is connected to the brush base to drive the brush base to perform oscillating rotation, the quiet sleeve is sleeved over the oscillating shaft and in tight fit with the housing assembly to constrain the oscillation amplitude of the oscillating shaft, the transmission hub is configured to connect to a toothbrush handle, is disposed below the quiet sleeve, and is in interference fit with the housing assembly, and the lower end of the oscillating shaft passes through the transmission hub to connect to a drive motor assembly.

2. The brush head of an electric toothbrush of claim 1, wherein the oscillating shaft has a bent portion at its upper end, with the quiet sleeve sleeved below the bent portion; and the quiet transmission assembly further comprises an elastic member that is disposed below the quiet sleeve, and the elastic member enables the quiet sleeve to be fixed in position in the up-down direction relative to the oscillating shaft by upwardly biasing the quiet sleeve.

3. The brush head of an electric toothbrush of claim 2, wherein the elastic member is a coil spring sleeved over the oscillating shaft; and an oscillation gap is disposed between the oscillating shaft and the transmission hub, and the coil spring is accommodated within the oscillation gap.

4. The brush head of an electric toothbrush of claim 3, wherein the oscillating shaft is provided with a first shaft shoulder and a second shaft shoulder; the first shaft shoulder is located above the second shaft shoulder and abuts against the coil spring; and the second shaft shoulder is configured to connect to the drive motor assembly.

5. The brush head of an electric toothbrush of claim 1, wherein the transmission hub is a diameter-varying structure and has a shoulder disposed at a middle portion thereof, and a region of the transmission hub above the upper face of the shoulder is in an interference fit with the housing assembly; and a shaft key lug is disposed on the upper face of the shoulder, and is keyed with the housing assembly for positioning.

6. The brush head of an electric toothbrush of claim 1, wherein the back of the brush base is provided with a shaft hole, and a connection pivot is disposed within the shaft hole for rotatably connecting the brush base to the housing assembly; and a radial pin hole is further disposed on the back side of the brush base, and a positioning pin is disposed in the pin hole to engage the brush base with the housing assembly.

7. The brush head of an electric toothbrush of claim 6, wherein the brush base is provided with a pin slot corresponding to the positioning pin, and is provided with a shaft slot corresponding to the oscillating shaft.

8. The brush head of an electric toothbrush of claim 1, wherein the lower end of the transmission hub is provided with a snap-fit mechanism that is configured for snap-fit connection with the toothbrush handle of the electric toothbrush, and the interference retention force between the transmission hub and the housing assembly is greater than the snap-fit retention force between the snap-fit mechanism and the toothbrush handle of the electric toothbrush.

9. The brush head of an electric toothbrush of claim 1, wherein each of the upper and lower ends of the quiet sleeve is provided with a radially extending circular retaining flange, and the outer peripheral surface of each circular retaining flange is uniformly provided with a plurality of sets of ribs; and each of the upper and lower end faces of the quiet sleeve is provided with an end face protrusion.

10. An electric toothbrush, comprising a toothbrush handle and the brush head of claim 1.

* * * * *